United States Patent [19]
Zhu

[11] Patent Number: 4,763,939
[45] Date of Patent: Aug. 16, 1988

[54] PROTECTIVE ROLLER DEVICE FOR CAR

[76] Inventor: Xiaoyang Zhu, No. 22, Lane 376, Yan'an Xi Lu, Shanghai, China

[21] Appl. No.: 948,170

[22] Filed: Dec. 31, 1986

[30] Foreign Application Priority Data

Jan. 3, 1986 [CN] China .................................. 86100084

[51] Int. Cl.⁴ ............................................. B60R 19/00
[52] U.S. Cl. ........................................ 293/17; 293/38; 293/43
[58] Field of Search ................... 293/1, 15, 17, 18, 19, 293/38, 43, 118

[56] References Cited

U.S. PATENT DOCUMENTS

| | | | |
|---|---|---|---|
| 1,104,647 | 7/1914 | Finkelstein | 293/17 |
| 1,106,783 | 8/1914 | Clay | 293/43 |
| 1,591,407 | 7/1926 | Sideman | 293/38 |

Primary Examiner—Robert R. Song
Attorney, Agent, or Firm—Pennie & Edmonds

[57] ABSTRACT

The present invention relates to a protective roller device for attachment to various kinds of vehicles for prevention of injuries to persons or damages to objects encountered in traffic accidents when persons may stumble or objects may fall under the area of the wheel of the vehicle. The device comprises a set of vertical and parallel arranged protective rollers to be fixed on the car body at a location proximate to the car wheels. The said protective rollers consists of a center shaft and an elastomeric buffer component sheathed around the said shaft for free rotate thereabout. When equipped with said protective roller devices, the car is able to gently push the persons or objects encountered out of the dangerous wheel area and to prevent injuries or damages.

6 Claims, 4 Drawing Sheets

PROTECTIVE ROLLER DEVICE FOR CAR

The present invention relates to a safety device to be attached to automobiles to prevent or reduce injuries to persons and damage to objects in certain types of traffic accidents, but it does not affect the operation of the vehicle itself.

As the volume of automobile traffic increases, it is inevitable that traffic accidents will occur. Accidents can occur as a result of persons or objects stumbling or being bumped under an automobile's chassis. The person or object may be crushed by the cars and severely injured or even killed. Unfortunately, effective and simple means to prevent or at least to reduce such accidents are unavailable.

The present invention is intended to provided a roller device for cars so as to protect or gently remove persons or objects from the automobile's path. It will reduce or eliminate the necessity of sudden braking and also avoid resulting injuries to passengers of the vehicle. Casualties or damages can be prevented or reduced.

The protective roller device of the present invention is fixed to the car's body in front of its wheels and comprises a set of vertically suspended protective rollers. The protective roller consists of a center shaft and an elastomeric or foam rubber material, which is sheathed about and rotatable around the center shaft. The protective rollers are positioned in a vertically parallel set that is fixedly located slightly in front of the vehicle wheels. The vertical set of rollers are dimensioned to turn away and protect a body or object from coming into contact with the vehicle wheels. See FIGS. 2-3. Although the vertical set of rollers can be placed directly in front of the wheels, or at 90° to mounting member 23, it is preferably mounted at an angle of 20°-35°, as shown in FIG. 3.

Now with references to the attached drawings, the details of the embodiment of the present invention are described as follows.

Figure 1:
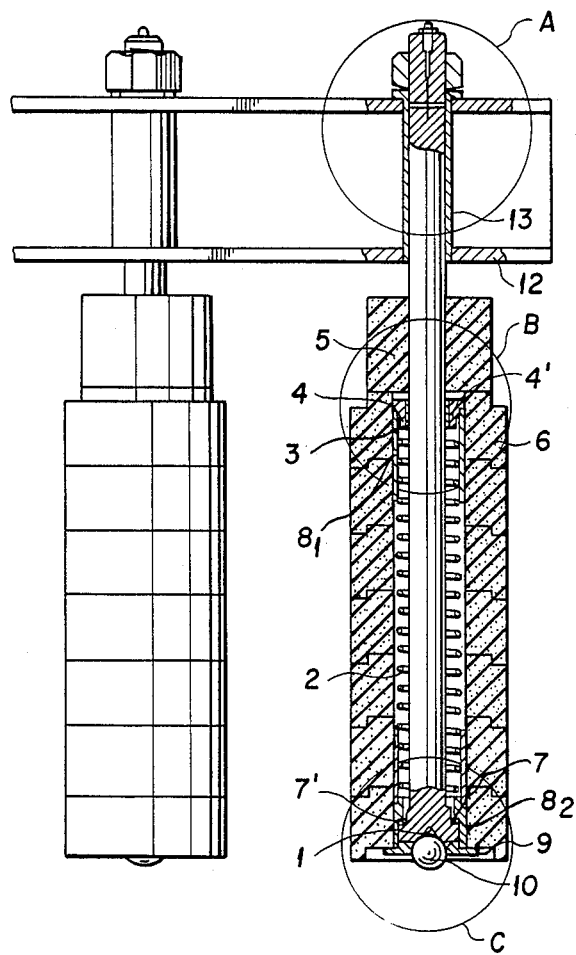
FIG. 1 is an elevational view of two of the vertically separated, parallel rollers as they are suspended from a mounting frame, one of the rollers is shown in cross-section to portray its structure.
Figure 1A:
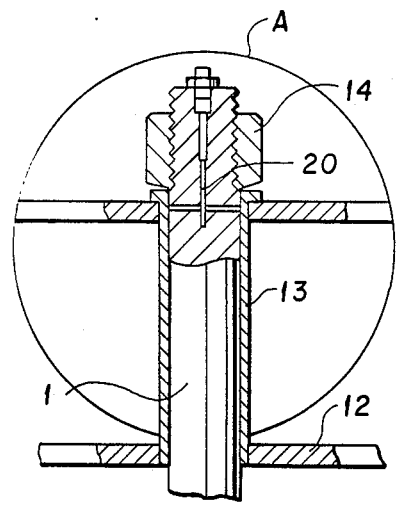
FIG. 1a shows the structured details of the circled portion "A" of FIG. 1, and in particular the manner in which a roller shaft is suspended from frame 12.
Figure 1B:
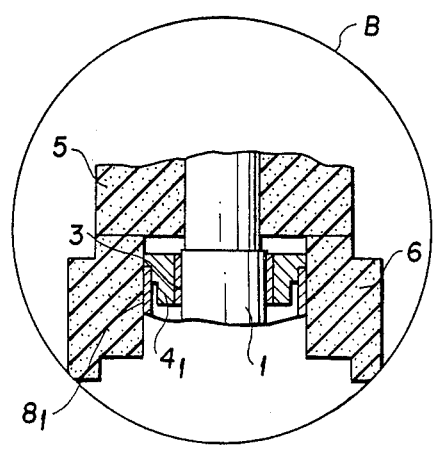
FIG. 1b shows the structural details of the circled portion "B" of FIG. 1 and in particular the interrelationship of the upper rollable members relative to the central mounting shaft.
Figure 1C:
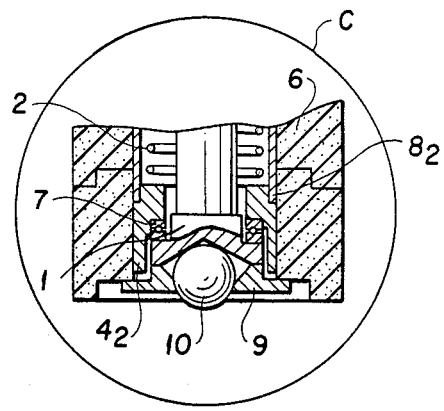
FIG. 1c shows the structural details of the circled portion "C" of FIG. 1 and in particular the interrelationship of the lower rotatable members relative to the central mounting shaft and the manner in which a spherical component is rotatably mounted to the end of the central shaft.

With reference to the drawings, and in particular to FIG. 1, the end of center shaft 1 is shown to be fitted with a thrust bearing 7 and sleeve 8 to withstand the weight of the roller device and to enable free rotation of the foam rubber sheathing. As shown in FIGS. 1 and 1b, bushing sleeve 3 and bearing 4 are mounted at the midsection of shaft 1. Spring 2 is mounted about central shaft 1, between bearing 4 and sleeve 8. A series of foam rubber sleeves 5 and 6 are fitted around sleeve 8 to provide a foam sheathing over the substantial length of shaft 1.

A steel ball 10 and platen 9 is provided at the free, downwardly directed end of central shaft 1. The ball supports the protective roller on the road surface and on encountering uneven surfaces results in upward, axial movement of the central shafts relative to mounting frame 12 to prevent damage. Upon return to a smooth surface, the protective rollers will automatically extend to their normal positions due to the elastic effect of the foam sleeves and the weight of the rollers. Best results are obtained when the distance between the spherical component 10 and the road surface are kept to a minimum.

The elastomeric sleeve components 5 and 6 can be made in sections of foams of generally the same shape and material which are stacked one upon the other. This structural formation is for the sake of convenience in manufacture and maintenance. On the top of sleeve 6 there is also stacked a section of elastomeric sleeve 5 to provide protection to the central shaft 1 and associated parts.

Figure 3:
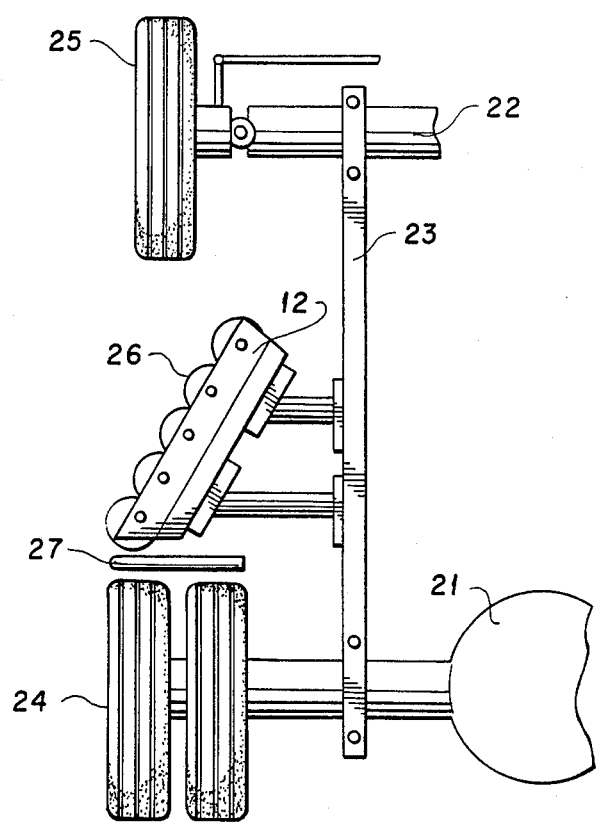
FIG. 3 shows a set of rollers mounted along the side of a car and in front of the rear wheels.

The angle between the mounting frame 12 of the protective roller bars and the car, see FIG. 3, is 20°-35°, depending on the track width of the wheels. In principle, the frame 12 must cover the width of the wheels. The rollers 2b of FIG. 3 are shown to be vertically mounted to provide a 15 millimeter gap between rollers. In operation, if a person should accidentally fall under the chassis of a car, the foam rubber wheels will push him to one side to prevent him from being crushed by the wheels.

The present invention is intended to be mounted in front of the mid or rear wheels of a vehicle to prevent the wheels from running over the person's body.

Frame 12 is used to assemble the said parallely suspended protective roller for attaching them to the car body. The protective rollers are suspended on frame 12 by slidingly fitting the center shaft 1 through the bushing component 13. Bushing 13 is fixed to frame 12. As a result, when the car is driven on rough roads and upon the spherical component 10 contacting road obstructions, the elastomeric buffer component will rise together with center shaft (1). Since the center shaft (1) is slidable along the bushing 13, the elastomeric buffer component may slide along shaft 1 as well. Upon the passing of the obstruction, the protective rolling will return to their original suspending position on the component 12 by virtue of the weight of the protective roller itself.

Figure 2:
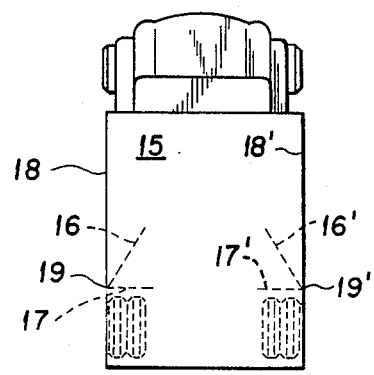
FIG. 2 illustrates the protective roller devices mounted in front of each of the vehicles' rear wheels.

In FIG. 2, 15 indicates the said horizontal plane of the said car body and 16, 16' indicate the projection of the protective rollers on the said horizontal plane 15. Projection 16, 16' should fall within the horizontal plane 15 should be approximately equal to or greater than the total widths of the rear wheels. Projections 16, 16' intersect the sides 18, 18' of the horizontal plane 15 with intersected points 19, 19'. The angles of intersection between the projections 16, 16' and sides 18, 18' may be at any degree from 0°-90°, but the best and preferable for it should be 20°-35° as found by experiments.

The present invention is generally applicable to all kinds of automobiles and is especially suitable for public transportation vehicles, such as big and medium size buses and trucks. It is usually fitted on both sides of a car slightly in front of the rear wheels and is preferable to use a common frame component 12 shared by both sides to form an integral part of them in order to enhance the structural stiffness of the devices.

Cars equipped with the devices of the present invention can avoid injuries to persons or damages to objects encountered in traffic accidents when persons may stumble or objects fall into the area of the wheel track under the chassis, especially when accidents are out of driver's sight behind the front wheels of the car. In use, one or more of the said protective rollers will come into contact with the persons or objects and cause the elastomeric buffer to rotate, thus gently pushing the persons or objects from out of the wheel track area.

Experiments have been conducted on the protective roller device of the present invention by using animals, such as bundled pigs with satisfactory results.

The principles or aims of the present invention have been included in the claims of the patent application. The embodiments of the present invention as given herein are not limited to the example so described. Therefore, any modifications or changes based on the principles of the present invention are also included in the present claims.

I claim:

1. A protective roller assembly for attachment to the sides of a car, slightly in front of the wheels comprising, a center shaft, an elastomeric sleeve which is sheathed externally around the said center shaft and is rotatable freely thereabout, said center shaft having one end mounted for vertical movement to said car, and roller means mounted for rotation on the other end of the same center shaft.

2. The protective roller assembly of claim 1 mounted to both sides of the car, slightly in front of the rear wheels at an angle to deflect any objects away from the wheels.

3. The protective roller assembly of claim 2 wherein said protective roller assembly is mounted at an angle of 20°–35°.

4. The protective roller assembly of claim 1 comprising a central shaft; a platen fixed to the free end of said shaft; a bearing fixed between said platen and a shoulder formed on the lower free end of the center shaft, a flange fixedly positioned intermediate of the ends of said shaft, a journal bearing formed on said flange, said center shaft passing slidingly through said journal bearing, a spring fitted between said journal bearing and said central shaft, and a foam rubber sleeve 6 fitted elastically and tightly about the spring, a spherical component rotatably mounting said spherical component to the free end of said center shaft.

5. The protective roller device as claimed in claim 4 further characterized in that the said elastomeric sleeve is in the form of similarly shaped, multi-sections stacked one upon the other.

6. The protective roller device as claimed in claim 5 further characterized in that the said set of basically vertical and parallel mounted protective rollers shares a common frame component for mounting to the car body, the said frame component through a bushing component which is fixed on the frame component so that the said protective roller is reciprocally mounted within the bushing component when the car is running and when the said spherical component 10 touching the ground.

* * * * *